(12) United States Patent
    Baron

(10) Patent No.: US 9,789,797 B2
(45) Date of Patent: Oct. 17, 2017

(54) EXTENDIBLE HAND HOLD DEVICE FOR GOLF AND RECREATION CARTS

(71) Applicant: Innovative Accessories, LLC, Trophy Club, TX (US)

(72) Inventor: Dwight David Baron, Trophy Club, TX (US)

(73) Assignee: Innovative Accessories, LLC, Trophy Club, TX (US)

( * ) Notice: Subject to any disclaimer, the term of this patent is extended or adjusted under 35 U.S.C. 154(b) by 0 days.

(21) Appl. No.: 15/144,320

(22) Filed: May 2, 2016

(65) Prior Publication Data
US 2016/0318433 A1    Nov. 3, 2016

Related U.S. Application Data

(60) Provisional application No. 62/155,113, filed on Apr. 30, 2015.

(51) Int. Cl.
    *B60N 3/02*    (2006.01)
(52) U.S. Cl.
    CPC .................... *B60N 3/023* (2013.01)
(58) Field of Classification Search
    CPC ........... B60N 3/02; B60N 3/023; B60N 3/026
    USPC ............................................... 296/1.02, 1.07
    See application file for complete search history.

(56) References Cited

U.S. PATENT DOCUMENTS

| | | | | |
|---|---|---|---|---|
| 2,586,986 | A | * | 2/1952 | Orrison .................. B60N 3/026 105/354 |
| 3,347,575 | A | * | 10/1967 | Morris .................... F16B 7/105 16/429 |
| 6,109,200 | A | | 8/2000 | Rieger |
| 6,431,643 | B2 | | 8/2002 | Grey |
| 7,367,347 | B2 | | 5/2008 | Field |
| 7,819,220 | B2 | | 10/2010 | Sunsdahl et al. |
| 8,132,827 | B2 | | 3/2012 | Bergman et al. |
| 8,251,423 | B1 | * | 8/2012 | Lingle ...................... B60R 3/00 296/1.02 |

(Continued)

FOREIGN PATENT DOCUMENTS

| | | |
|---|---|---|
| CN | 202669565 | 1/2003 |
| CN | 201172427 | 12/2008 |
| KR | 20150066886 | 6/2015 |

OTHER PUBLICATIONS

UTV & Golf Cart Hand Holds, The Golf Car Catalog.com, Special Offers, Gifts & New Products, www.golfcarcatalog.com.

*Primary Examiner* — Jason S Morrow
*Assistant Examiner* — E Turner Hicks
(74) *Attorney, Agent, or Firm* — Locke Lord LLP

(57) ABSTRACT

The present invention relates generally to an extendible and retractable hand hold device for use on golf carts and other transportation vehicles by children and smaller adults to add increased stability and safety. The extendable and retractable hand hold device is securely mounted to the roof of a typical golf cart. The hand hold device has a graspable handle on one end, a length-adjustable shaft and a hinge on the other end. The hinged end is further connected to a mounting plate for securing the device to the roof of the cart. The device is rotatable downward from a stored position where it is flat along the underside of the roof, to an in-use position where it is extending downwardly from the roof to a position that is reachable by any size golf cart user or occupant.

7 Claims, 3 Drawing Sheets

(56) References Cited

U.S. PATENT DOCUMENTS

| | | | |
|---|---|---|---|
| 8,794,660 B1* | 8/2014 | Stover | A01D 34/64 16/110.1 |
| 9,079,542 B1* | 7/2015 | Ross | B60N 3/023 |
| 2004/0036305 A1 | 2/2004 | Smith et al. | |
| 2006/0143868 A1* | 7/2006 | Bauer | B60N 3/023 16/438 |
| 2016/0257233 A1* | 9/2016 | Stott | B60R 13/02 |

* cited by examiner

EXTENDIBLE HAND HOLD DEVICE FOR GOLF AND RECREATION CARTS

CROSS REFERENCE TO RELATED APPLICATIONS

This application claims the benefit of U.S. Provisional Patent App. No. 62/155,113 filed Apr. 30, 2015.

BACKGROUND OF THE INVENTION

1. Field of the Invention

The present invention relates generally to an extendible hand hold stability and safety device for golf and other recreation carts that is reachable and usable for children and shorter adults that are unable to reach the currently provided hand holds. More specifically, the invention relates to an extendible hand hold device for golf carts that is securely installed under or molded into and as part of the current canopy roof or a similar and proximal location of a cart that rotates from a flat, clamped position adjacent to the roof when not in use to an accessible position to assist the occupant in providing a reachable and easily accessible hand hold.

2. Description of Related Art

The use of golf carts on and off the golf course as a means of transportation has grown into a billion dollar industry. Golf type carts are now routinely used for transportation purposes at sporting events, airports, hospitals, concerts, apartment complexes, resorts, storage facilities, college campuses, military bases and by many other businesses at various locations. For example, in retirement communities golf carts have become the primary means of transportation, and many communities have approved them for use as street legal vehicles. As the use of these carts is becoming more widespread in settings both on and off the golf course, the number of documented injuries to users has risen. The United States Consumer Products Safety Commission (USCPSC) conducted a study in 2010, which found approximately 15,000 golf cart related injuries requiring emergency room treatment each year. Of these injuries, approximately 40% involve children (age<16) and 50% of these injuries resulted from the user falling from a moving cart, especially during left turns.

The current design of golf carts has evolved over the past 10-15 years and the larger, metal tubular arm rails that were common have been replaced by small, irregularly-shaped hard plastic hip restraints. The old metal arm rails served as both a hand hold device and a restraint for keeping the occupant from sliding off of the cart's bench style seat during its operation including while turning. The new smaller hip restraints have limited effectiveness as a hand hold device due to their size, shape and proximity to a user's arm during normal operation. To provide additional safety, the cart manufacturers have added an alternative hand hold located in the canopy roof top of the golf cart, which allows taller users to a way to stabilize themselves during operation and especially during turns. However, due to its location in the roof and subsequent height above the seat, this hand hold is inaccessible to children and smaller adults because their arms are not long enough to reach the hand hold, which makes them especially susceptible to ejection and falls due to their reliance solely upon the hip restraint as a hand hold for stability. This group is in further danger of their small size and because their feet cannot reach the floor, which makes the need for an accessible hand hold even more important. Several studies have been conducted by various accident research and biomechanical experts which further supports and hows this danger.

It is therefore desirable to have an extendable and retractable hand hold device that is accessible to and can be used by children and smaller adult to assist in holding themselves securely in the cart to help eliminate the possibility of a fall or ejection from the cart during normal operation.

SUMMARY OF THE INVENTION

The present invention provides generally for an extendible and retractable hand hold device for use on golf carts and other transportation vehicles by children and smaller adults occupants and passengers to add increased stability and safety. The extendable and retractable hand hold device is securely mounted to the roof of a typical golf cart. In some types of carts, it may be desirable to have multiple devices installed for each occupant that does not currently have an accessible hand hold device. The hand hold device has a graspable handle on one end, a length-adjustable shaft (or shafts) and a hinge on the other end. The hinged end is further connected to a mounting plate (or mounting plates if more than one shaft) for securing the device to the roof of the cart. The device is rotatable downward from a stored position where it is flat along the underside of the roof, to an in-use position where it is extending downwardly from the roof to a position that is reachable by any size golf cart user. The rotation between positions is allowed through the use of the hinged connection between the hinged shaft end of the device and the mounting plate to make it further accessible to occupants of all sizes and heights.

The device also includes a clamping mechanism mounted to the roof of the golf cart that clamps the device and holds it secure to the underside of the roof when the device is rotated up in its stored position when not in use, or alternatively, a sprig-loaded mechanism that holds it securely in its stored position when not in use. The shaft(s) of the device is preferably extendable and retractable through a telescopic motion to allow the length of the shaft to be adjusted to accommodate individual occupants based on their size and height. The longer the shaft is extended, the closer the graspable handle will be to the occupant when the hand hold device is rotated downward into its in-use position.

The novel features and construction of the present invention, as well as additional objects thereof, will be understood more fully from the following description when read in connection with the accompanying drawings.

BRIEF DESCRIPTION OF THE DRAWINGS

The invention is further described and explained in relation to the following figures of the drawings wherein.

Like reference numerals are used to describe like parts in all figures of the drawings.

DESCRIPTION OF THE PREFERRED EMBODIMENTS

Figure 1:
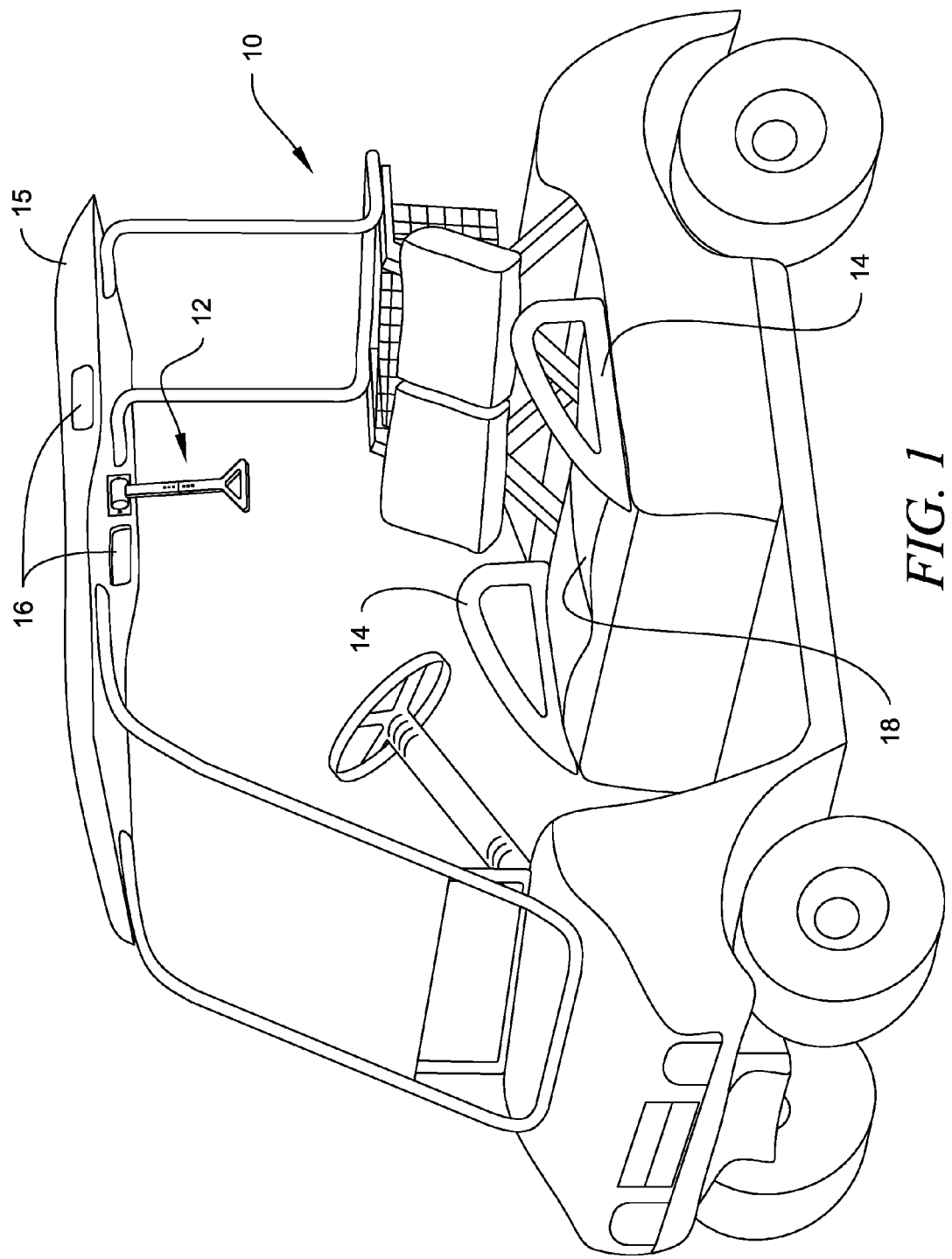
FIG. 1 is a perspective view of a prior art golf cart with the extendable and retractable hand hold device in its in-use position.

Referring to FIG. 1, prior art golf cart 10 is shown with hip restraints 14, roof 15, roof handle holes 16 and seat 18.

In normal operation, the user of golf cart 10 sits on seat 18 with his hip in contact with or close proximity to hip restraint 14. The user also can grasp roof handle hole 16 to provide stability and help prevent ejection from the vehicle during turns and other maneuvers of the cart. Extendible and retractable hand hold device 12 is shown in its lowered in-use position, which provides shorter users with arms not long enough to reach roof handle hole 16 a reachable, graspable handle. In its in-use position shown, hand hold device 12 extends perpendicularly down from its secure attachment point on roof 15.

Figure 2:
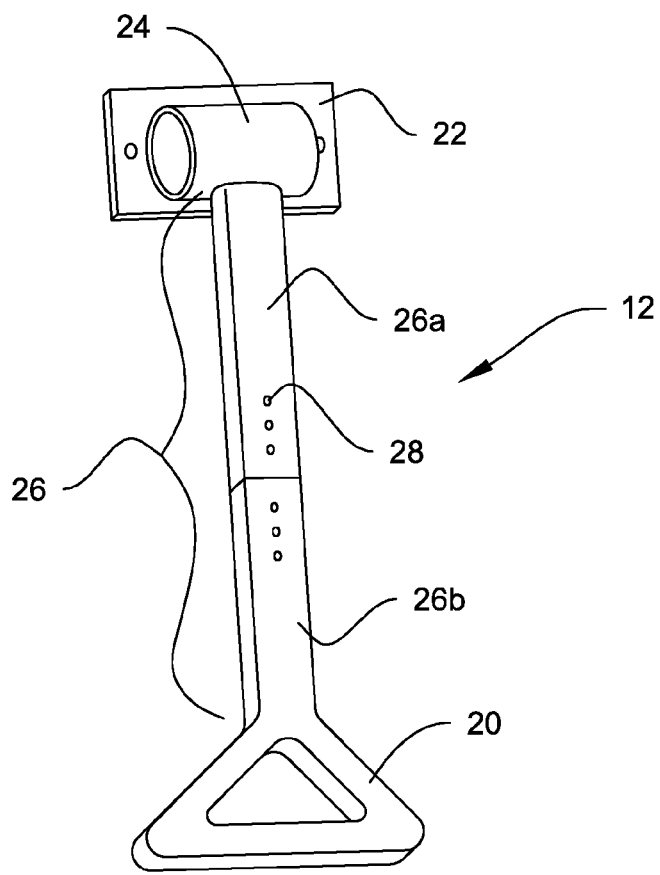
FIG. 2 is a perspective view of the extendable and retractable hand hold device in its fully retracted position.
Figure 3:
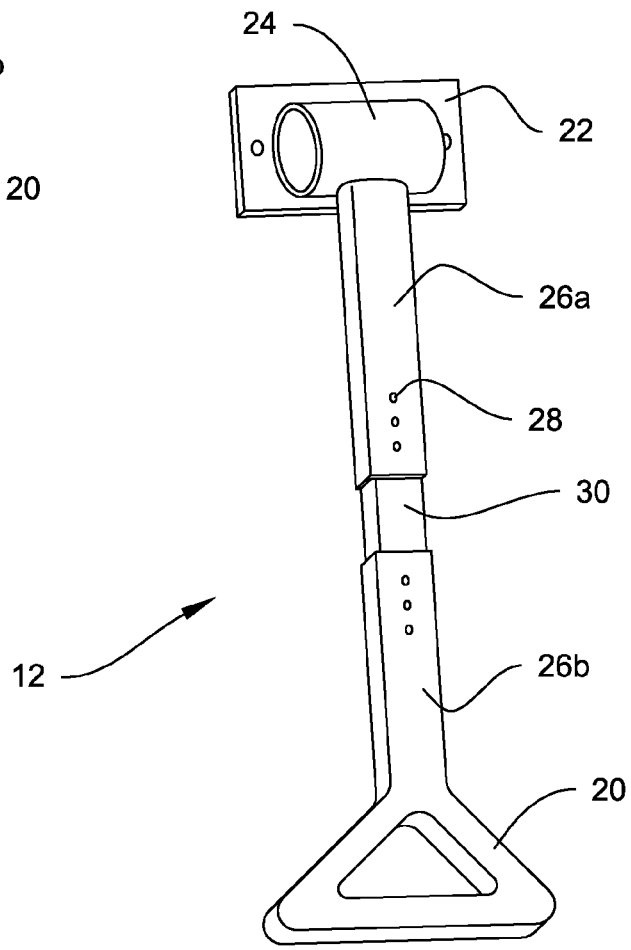
FIG. 3 is a perspective view of the extendable and retractable hand hold device in its fully extended position.

Referring to FIGS. 2 and 3, extendible and retractable hand hold device 12 is shown. Hand hold device 12 is preferably comprised of shaft 26, which connects graspable handle 20 to hinge 24. Graspable handle 20 is the portion of hand hold device 12 that is intended to be grasped by the user. Graspable handle 20 can either be rotatable in relation to shaft 26 or fixed in relation to shaft 26. Shaft 26 is shown with a square cross-section in the figures, but could take on a variety of different shaped cross-sections, including circular. Hinge 24 is mechanically connected to mounting bracket 22. Mounting bracket 22 is used to securely attach hand hold device 12 to roof 15 of prior art golf cart 10 shown in FIG. 1. In an alternate embodiment, mounting bracket 22 can be integrally molded into roof 15 of prior art golf cart 10. In the preferred embodiment, mounting bracket 22 has two holes which allows the attachment of mounting bracket 22 to roof 15 through the use of bolts and nuts, but any known, secure attachment method could be used to secure hand hold device 12 to roof 15. Hinge 24 allows rotation of hand hold device 12 while mounting bracket 24 remains stationary and securely attached to roof 15. Alternatively, hand hold device 12 can be releasably attached to mounting bracket 24 to allow removal of hand hold device 12 when not in use. In this embodiment, mounting bracket 24 would remain attached to roof 15.

FIG. 2 shows hand hold device 12 in its fully retracted state wherein shaft 26 is at its shortest length. In this state, outer upper shaft 26a is adjacent to and contacting lower outer shaft 26b. FIG. 3 shows hand hold device 12 in an extended state wherein shaft 26 is not at its shortest length. In this extended state, outer upper shaft 26a is not in contact nor adjacent to outer lower shaft 26b. Inner shaft 30, which resides inside of outer shafts 26a and 26b is visible when hand hold device 12 is in an extended state. Outer shafts 26a and 26b are slidable along inner shaft 30 and locked in place at the desired location through the use of spring-loaded detents (not shown) and receiving holes 28. Although the use of dual shafts is the preferred embodiment to allow for extendibility because it provides additional support, any known mechanisms for allowing extendibility would also be acceptable. Such other mechanisms could include a single outer and inner shaft wherein the inner shaft slides inside of the outer shaft and is locked in place by a similar detent/hole mechanism or through the use of a round telescoping shaft with an external screw down friction ring, which provides more precise length adjustment.

Figure 4:
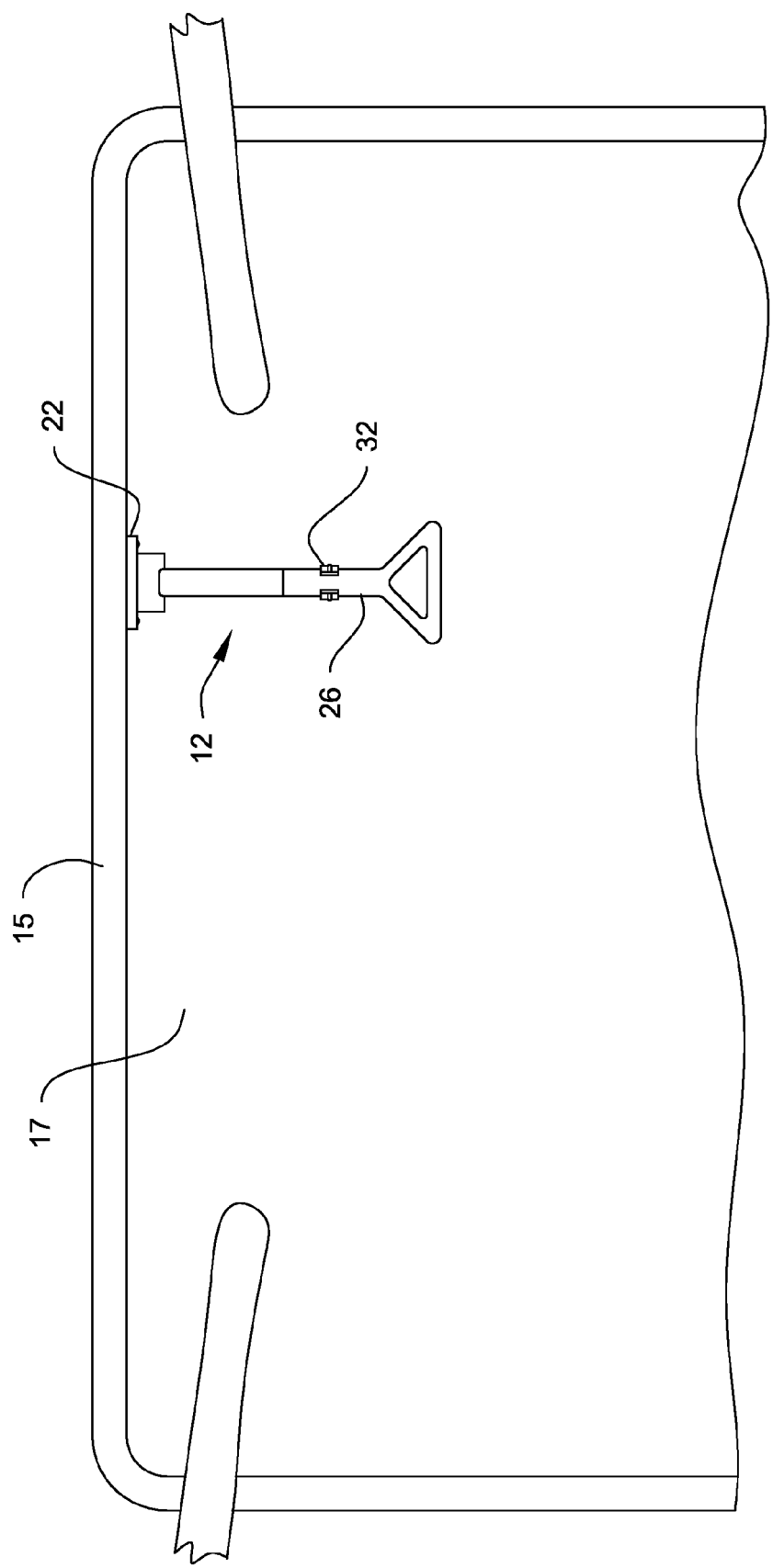
FIG. 4 is a cut-away bottom view of the roof of a prior art golf cart with the extendable and retractable hand hold device in its stored position.

Referring to FIG. 4, underside 17 of roof 15 of golf cart 10 is shown with hand hold device 12 mounted thereto through the use of mounting bracket 22. Hand hold device 12 is shown in its stored position adjacent to and flat against underside 17 of roof 15. Hand hold device is preferably held in this stored position through the use of clamp 32, which frictionally engages and releasably holds shaft 26. While the use of clamp 32 is the preferred embodiment, any other known holding mechanism or method could be employed as long as it provides secure, yet releasable, engagement of hand hold device 12 to underside 17 of roof 15. For example, straps or ties could be installed on underside 17 of roof 15 and be used to keep hand hold 12 in its stored position.

In use, a golf cart rider who desired a hand hold device that was lower than roof handle holes 16 would unclamp shaft 26 from claim 32, which would allow hand hold device 12 to rotate down around hinge 24 into its in-use position (as shown in FIG. 1). The user could position graspable handle 20 at the desired position by altering the length of shaft 26. If the user decided to not use hand hold device 12, the user could simply rotate hand hold device 12 back into its stored position and clamp it in place on the underside 17 of roof 15 where it would not interfere with normal cart operation. Graspable handle 20 and shaft 26 are constructed of any materials sufficiently rigid to withstand the forces applied by the users when the golf cart is in motion.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

The invention claimed is:

1. An extendable hand hold device for use with transportation carts comprising:
   a graspable handle;
   one or more hinges rigidly connected to the transportation cart; and
   one or more extendable shafts connecting the graspable handle to the one or more hinges;
   wherein the extendable hand hold device rotates about the one or more hinges between a stored position and an in-use position; and
   further wherein the extendable hand hold device remains substantially horizontal when in its stored position and remains substantially vertical when in its in-use position.

2. The extendable hand hold device for use with transportation carts of claim 1 further comprising one or more mounting brackets;
   wherein the one or more hinges is rigidly connected to the one or more mounting brackets which in turn are rigidly connected to a roof of the transportation cart.

3. The extendable hand hold device for use with transportation carts of claim 1 further comprising one or more mounting brackets;
   wherein the one or more hinges is rigidly connected to the one or more mounting brackets which in turn are rigidly connected to a roof frame of the transportation cart.

4. The extendable hand hold device for use with transportation carts of claim 1 wherein the one or more hinges is rigidly connected to one or more mounting brackets formed as part of a roof of the transportation cart.

5. The extendable hand hold device for use with transportation carts of claim 1 further comprising a clamp for engaging and retaining the extendable hand hold device in its stored position.

6. The extendable hand hold device for use with transportation carts of claim 1 further comprising one or more springs to retain the extendable hand hold device in its stored position.

7. The extendable hand hold device for use with transportation carts of claim 1 wherein the one or more extendable shafts comprises at least one outer shaft with a plurality of spaced-apart receiving holes and one inner shaft with at least one spring-loaded detent; and further wherein the spring-loaded detent engages one receiving hole to rigidly lock the extendable shaft at a desired length.

* * * * *